United States Patent
Tsai

(10) Patent No.: US 12,526,955 B2
(45) Date of Patent: Jan. 13, 2026

(54) MONITORING CLOSED LOOP LIQUID AIR ASSISTED COOLING MODULE PERFORMANCE IN REAL TIME

(71) Applicant: DELL PRODUCTS L.P., Round Rock, TX (US)

(72) Inventor: Po-Cheng Tsai, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 461 days.

(21) Appl. No.: 18/174,144

(22) Filed: Feb. 24, 2023

(65) Prior Publication Data

US 2024/0292565 A1    Aug. 29, 2024

(51) Int. Cl.
*H05K 7/20* (2006.01)
*G06F 1/20* (2006.01)

(52) U.S. Cl.
CPC ........... *H05K 7/20272* (2013.01); *G06F 1/20* (2013.01); *G06F 2200/201* (2013.01)

(58) Field of Classification Search
CPC .............................. G06F 1/20; H05K 7/20272
See application file for complete search history.

(56) References Cited

U.S. PATENT DOCUMENTS 7,342,789 B2    3/2008   Hall et al.
2022/0334623 A1   10/2022  Zuo et al.

FOREIGN PATENT DOCUMENTS

CN          112204335 A  *  1/2021  .............. F24F 11/89

* cited by examiner

*Primary Examiner* — Mark A Connolly
(74) *Attorney, Agent, or Firm* — Larson Newman, LLP

(57) ABSTRACT

A liquid air assisted cooling system for cooling a component of an information handling system includes a liquid air assisted cooling module and a baseboard management controller. The baseboard management controller determines a quantity of coolant loss in the liquid air assisted cooling module.

18 Claims, 4 Drawing Sheets

100

MONITORING CLOSED LOOP LIQUID AIR ASSISTED COOLING MODULE PERFORMANCE IN REAL TIME

FIELD OF THE DISCLOSURE

This disclosure generally relates to information handling systems, and more particularly relates to monitoring closed-loop liquid air assisted cooling (LAAC) module performance in real time in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A liquid air assisted (LAAC) cooling system for cooling a component of an information handling system may include a liquid air assisted cooling module and a baseboard management controller. The baseboard management controller may determine a quantity of coolant loss in the liquid air assisted cooling module.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures as needed or desired.

Figure 1:
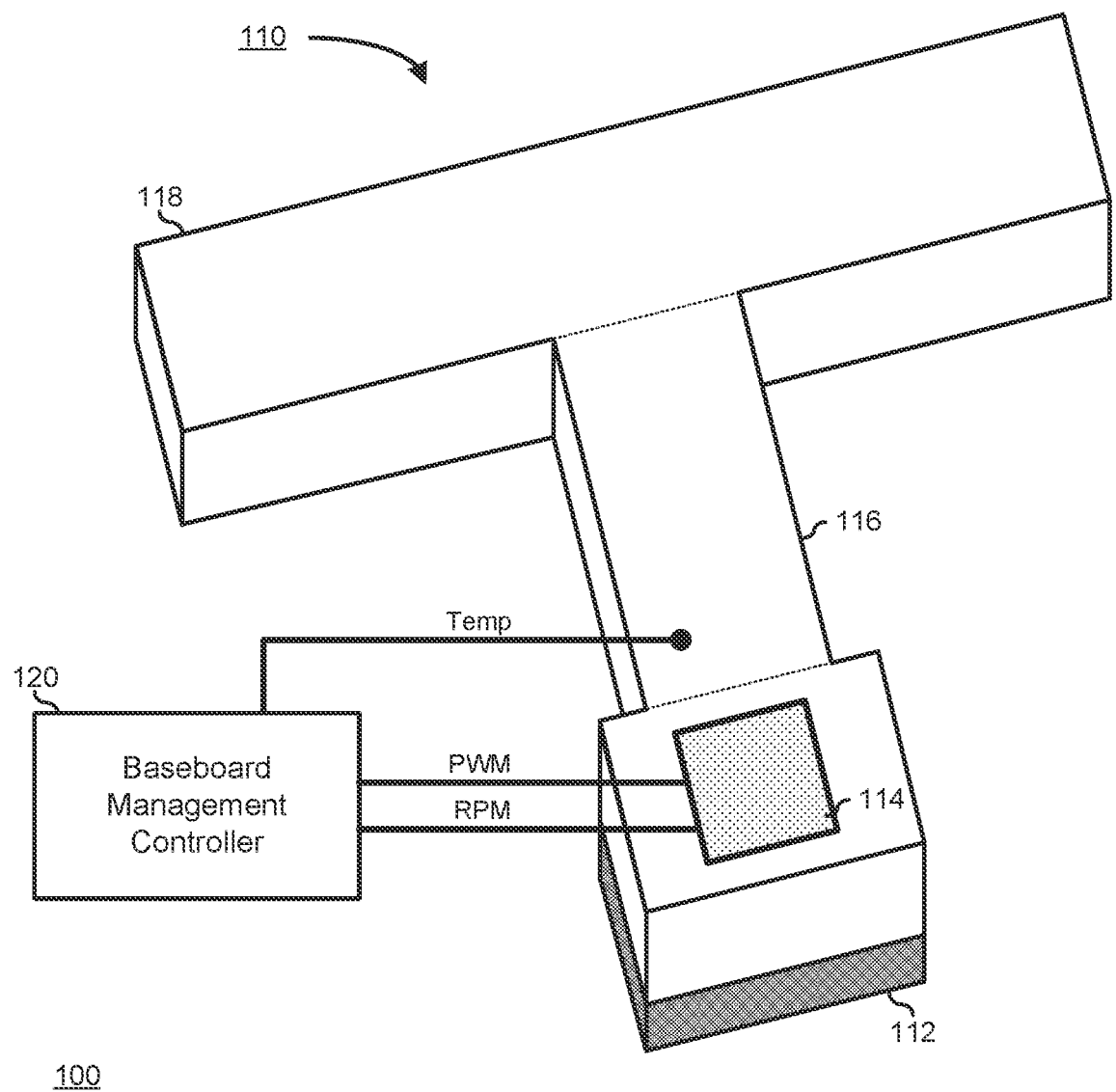
FIG. 1 is a block diagram of a liquid assisted air cooling (LAAC) system according to an embodiment of the current disclosure.

FIG. 1 illustrates a liquid cooling system 100, including a liquid assisted air cooling (LAAC) module 110 and a baseboard management controller (BMC) 120. Liquid cooling system 100 represents a system for removing heat from select components of an information handling system into an airflow of chilled air within the information handling system. LAAC module 110 is modular, self-contained, and closed loop liquid cooling apparatus that is completely housed within the confines of an information handling system, and without needing liquid coolant connections to components exterior to the information handling system. An example of LAAC module 110 may include a cooling apparatus for removing heat from one or more processors of a server system or other rack-mounted equipment, such as a 1U server, a 2U server, or the like. Here, the server system may include cooling fans to draw chilled air from a cold isle of a data center, through the enclosure of the server system to remove the heat generated by the server system, and to exhaust the heated air into a hot isle of the data center.

However, given the increasing heat generated by processors in server systems, utilizing air flow over processor heat sinks alone may provide insufficient cooling for the associated processors. As such, LAAC module 110 operates to provide a larger cooling surface for the heat generated by the processors by passing a coolant through a cold plate 112 affixed to the processors to absorb the heat. The heated coolant is then pumped by a pump 114 through tubing 116 to a larger radiator element 118 to chill the coolant. The chilled coolant is then recirculated by pump 114 back through tubing 116 to cold plate 112.

The amount of cooling provided by LAAC module 110 is governed by the air flow through the information handling system, and by the speed of pump 114. In this regard, BMC 120 operates to determine the temperature of the device to be cooled by LAAC 110, and to regulate the speed of pump 114 to optimize the cooling provided by the LAAC. The temperature information received by BMC 120 may be received from various temperature sensors within the information handling system, from thermal sensors in the device to be cooled, or from a coolant temperature sensor 119 provided on a hot side of LAAC 110, as needed or desired. When greater cooling is required, BMC 110 operates to send a speed setting signal to pump 114 to speed up the pump, and when less cooling is required, the BMC operates to send the speed setting signal to slow the pump down. In a particular embodiment, the speed setting signal includes a pulse width modulation (PWM). Pump 114 provides an actual speed signal back to BMC 120 that provides the operating speed of the pump to the BMC. In a particular embodiment, the actual speed signal is an indication of the revolutions per minute (RPM) that the pump is turning.

It has been understood by the inventors of the current disclosure that the performance of a LAAC module is dependent upon the coolant level within the LAAC module. For example, when the coolant level of an LAAC module full, the LAAC module will provide greater cooling than when the coolant level is lower. LAAC modules may be subject to leakage or evaporation. In many cases, LAAC modules are fabricated using rubber or other polymer tubing that is semi-permeable to the coolant liquid. Thus, even in the absence of any coolant containment failures (that is, leaks), the coolant level is subject to a stead decrease due to evaporation off of the tubing. If the coolant level gets too low, the performance of the LAAC module may degrade to the point that the component being cooled can not be safely operated without risk of overheating. Such overheating, while typically detectable, usually leads to a system failure or an extreme reduction in system performance.

To mitigate such ill effects of loss of coolant, they typical user of information handling systems with LAAC modules may enact procedures to monitor the coolant level in the LAAC modules. In particular the loss of coolant may be measured by removing the LAAC module from the information handling system, weighing the LAAC module, and comparing the determined weight of the LAAC module with a known-full weight of the LAAC module, the difference being accounted as the loss of weight due to coolant loss. If the loss of coolant exceeds a particular level, then the coolant level can be topped up, and the LAAC module returned into the information handling system. Such a procedure may necessitate the partial or complete shut down of the information handling system. While such a shut down may impact system performance, the impact can be planned to be performed, for example, at a time when the processing demands on the information handling system are low. Further, such planned impact may be deemed to be a better case than an unplanned shut down due to LAAC module failure. However there remains room for improvement in the monitoring, managing, and maintaining of LAAC modules in information handling systems.

In a particular embodiment, BMC 120 operates to determine a status of the speed setting signal provided to pump 114, and a status of the actual speed signal from the pump. BMC 120 then operates to correlate the actual speed signal with an amount of coolant loss. In a particular embodiment, BMC 120 performs an initialization phase when LAAC module 110 is filled and installed into the information handling system. BMC 120 provides a speed setting signal (X1) to pump 114 to direct the pump to operate at a maximum speed. For example, BMC 120 may send a PWM signal (Y1) to pump 114 that constitutes a 100% duty cycle to operate the pump at a maximum speed. BMC 120 then receives the actual speed signal from pump 114 and provides a correlation that the coolant level of LAAC module 110 is full when the maximum speed setting signal (X1) results in a minimum actual speed signal (Y1). As the coolant level decreases, the actual speed of pump 114 will increase due to there being lower coolant levels because the lower coolant levels present a lower resistance to the pump for any given speed setting signal.

Figure 2:
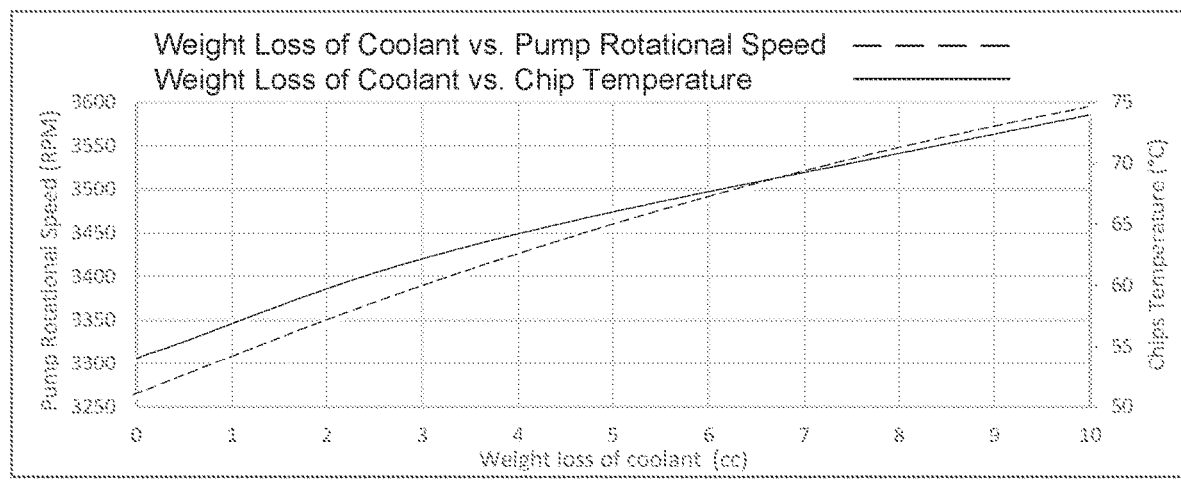
FIG. 2 is a graph illustrating an LAAC coolant loss level versus an LAAC pump speed, and the coolant level versus a device temperature according to an example of the current disclosure.

Then, in an evaluation phase that starts after the initialization phase is completed, BMC 120 continues to monitor the subsequent actual speed signal (Y2) to determine a coolant level of LAAC module 110. For example, FIG. 2 illustrates a graph 200 showing an amount of coolant loss (in cubic centimeters (cc)) as a function of the rotational speed (RPM) of pump 114. Thus, as the subsequent actual speed signal (Y2) is seen to increase, the amount of coolant loss is understood to be increasing. Graph 200 further illustrates the amount of coolant loss as a function of device temperature, and again it can be seen that the device temperature increases as the amount of coolant loss increases. BMC 120 is provided with a maximum temperature for the device, or similarly a maximum actual speed for pump 114, and provides an indication to service LAAC module 110 when the temperature exceeds the maximum temperature or the actual speed exceeds the actual maximum speed, based upon the correlated actual speed signal from pump 114.

In a particular embodiment, BMC 120 is further provided with one or more temperature thresholds below the maximum temperature, or similarly with lower actual speed thresholds below the maximum actual speed. When one of these lower thresholds is reached, increasing levels of warning are provided by BMC 120. For example, BMC 120 may provide a "warning" indication when the actual speed exceeds a first threshold, may provide an "urgent" indication when the actual speed exceeds a second threshold, and may provide a "critical" indication when the maximum speed level is exceeded. Other threshold level indications may be provided as needed or desired, including one or more thresholds above the maximum speed level that may be utilized to trigger various over-temperature mitigation events on the information handling system, as needed or desired.

In a particular embodiment, the indications provided by BMC 120 are utilized to adjust the performance level of the information handling system, as needed or desired. For example, when the device being cooled by LAAC module 110 represents a processor, and when the processor temperature exceeds the critical level, then BMC 120 may operate to provide a PROCHOT signal to immediately cut the power consumption of the processor. In another embodiment, the indications provided by BMC 120 are provided to a data center management system of a data center. In this embodiment, a system administrator may schedule a maintenance procedure to refresh the coolant level of LAAC module 110, as needed or desired.

In a particular case, BMC 120 performs the evaluation phase any time that the speed setting signal is set to the maximum level. In another case, BMC 120 operates to periodically set the speed setting signal to the maximum level, regardless of the cooling needs of the device. In this case, the maximum speed setting signal can be provided in order to determine the coolant level. In another case, BMC 120 can perform the evaluation phase any time that the speed setting signal is set to the maximum level, but can further determine whether or not the speed setting signal has not been set to the maximum level for a predetermined amount of time, after which the BMC forces the speed setting signa to the maximum level to determine the coolant level.

In another embodiment, BMC 120 operates to perform multiple initialization processes during the initialization phase. Here, each initialization process operates to correlate different speed setting signals with the associated actual speed signals. For example, the initialization process may be performed with speed setting signals at 20%, 40%, 60%, 80%, and 100%, or at any other speed setting signals, as needed or desired. In this embodiment, the evaluation phase may be performed at any time that the speed setting signal is set to one of the correlated levels, as needed or desired. As illustrated FIG. 1 shows where LAAC module 110 is configured to provide cooling to a single component, but this is not necessarily so, and additional components may be cooled by a LAAC in accordance with the teachings of the present disclosure, as needed or desired. Moreover, LAAC module 110 should be understood to be a highly simplified illustration of a typical LAAC module, where the various elements of the LAAC module are visible, or are located in different positions with respect to each other, as needed or desired.

Figure 3:
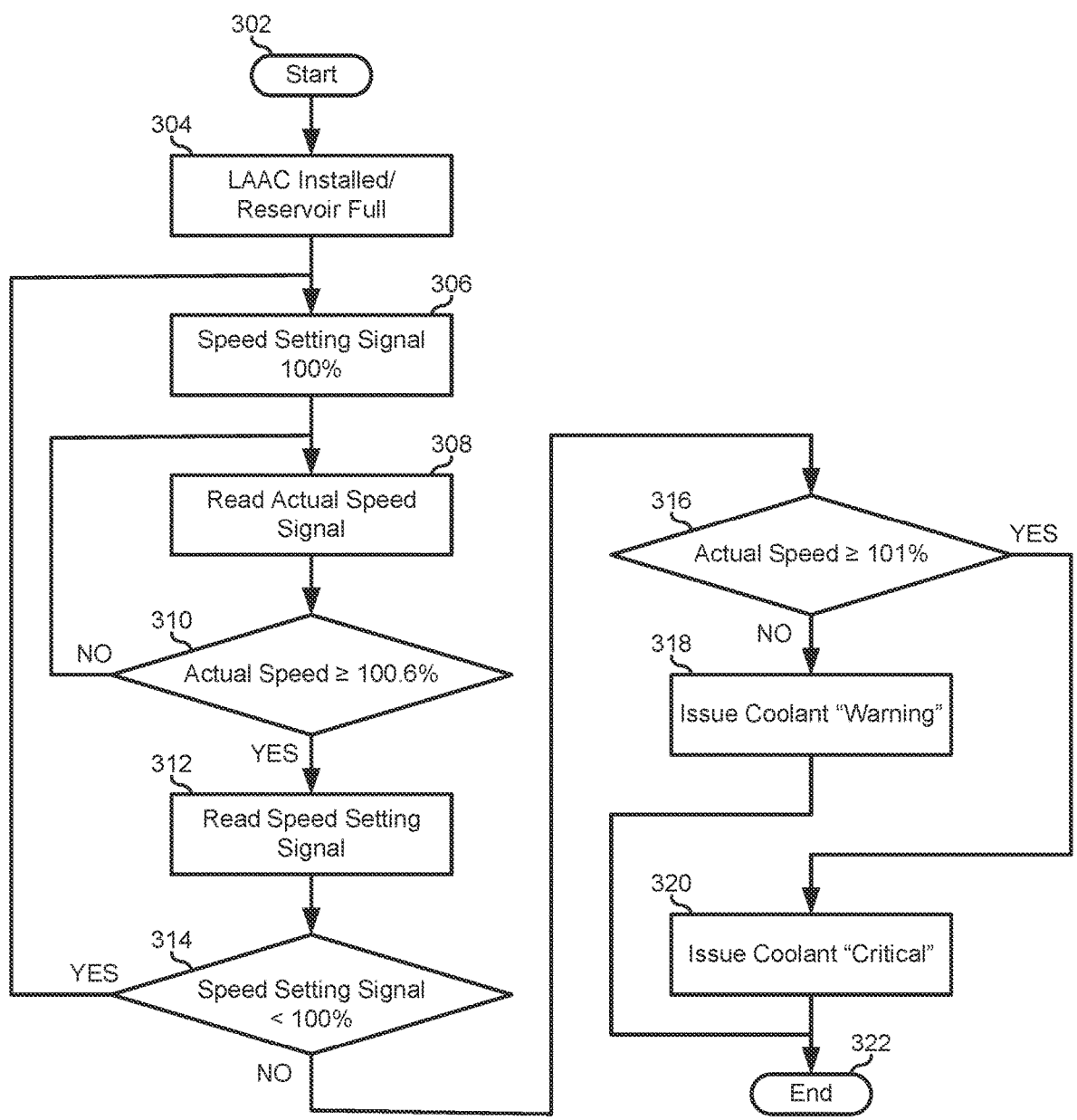
FIG. 3 is a flowchart illustrating a method for monitoring closed-loop LAAC module performance in real time in an information handling system according to an embodiment of the current disclosure.

FIG. 3 illustrates a method 300 for monitoring closed-loop liquid air assisted cooling (LAAC) module performance in real time in an information handling system, starting at block 302. A LAAC module is installed into an information handling system with a full coolant reservoir in block 304. A BMC of the information handling system sets the pump speed of the LAAC module to 100% in block 306. The BMC correlates the actual speed signal when the LAAC module has a full reservoir with a 100% pump speed. An actual speed signal from the LAAC module is read by the BMC in block 308. A decision is made as to whether or not the actual speed is less than 100.6% of the 100% level in decision block 310. If not, the "NO" branch of decision block 310 is taken and the method returns to block 308, where the actual speed signal is read by the BMC.

If the actual speed is not less than 100.6% of the 100% level, the "NO" branch of decision block 310 is taken, and The BMC reads the speed setting signal in block 312. A decision is made as to whether or not the speed setting signal is less than a 100% level in decision block 314. Here, because the speed setting signal was set to 100% in block 306, then the system may check to determine if the speed setting was changed by a user setting, as needed or desired. If the speed setting signal is less than the 100% level, the "YES" branch of decision block 314 is taken and the method returns to block 306 where the speed setting signal is set to 100%. If the speed setting signal is not less than the 100% level, the "NO" branch of decision block 314 is taken and a decision is made as to whether or not the actual speed of the pump is greater than or equal to 101% of the 100% speed level in decision block 316. If not, the "NO" branch of decision block 316 is taken, a coolant "warning" indication is issued in block 318, and the method ends in block 322. If the actual speed of the pump is greater than or equal to 101%, the "YES" branch of decision block 316 is taken, a coolant "critical" indication is issued in block 320, and the method ends in block 322.

Figure 4:
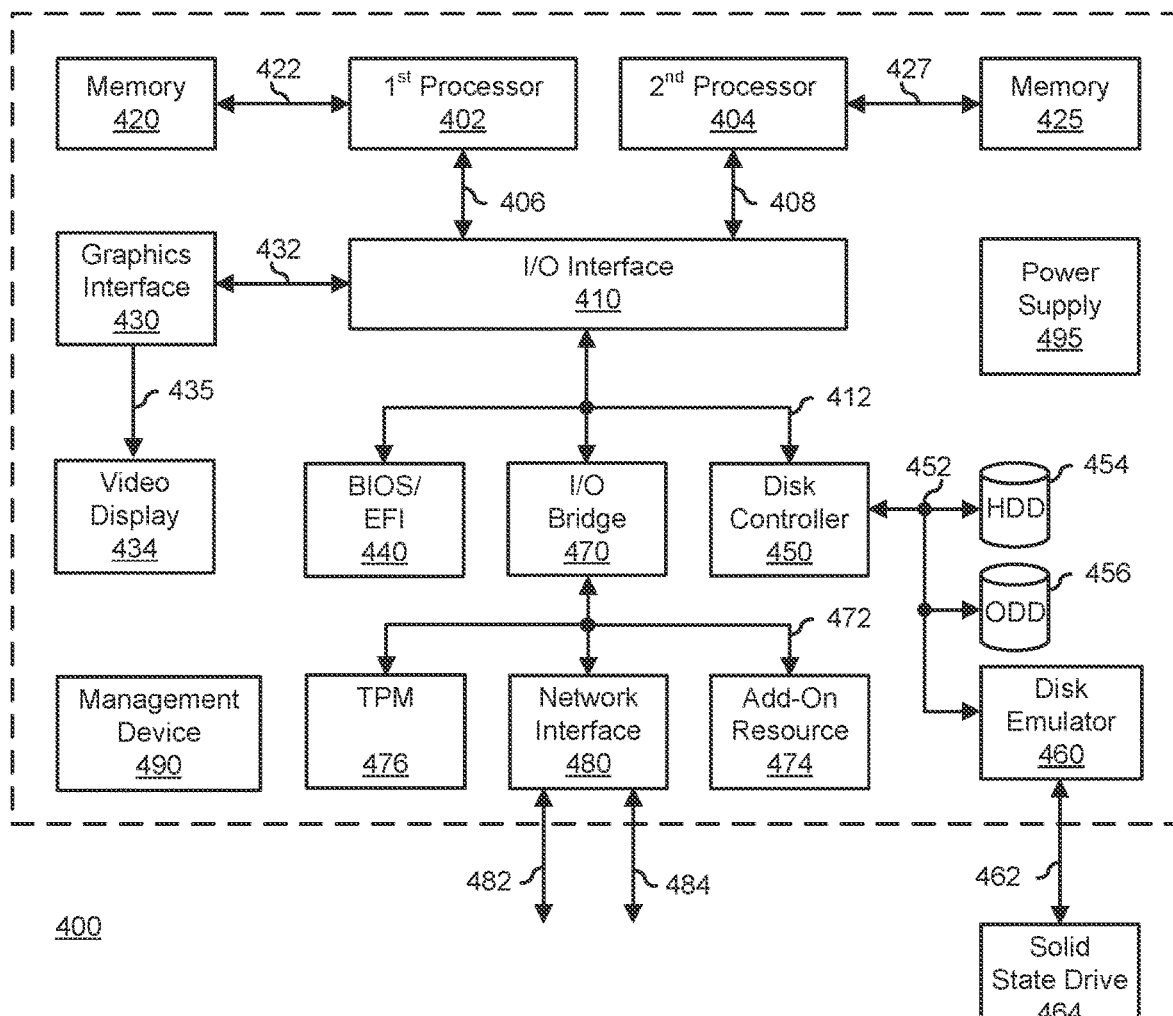
FIG. 4 is a block diagram illustrating a generalized information handling system according to another embodiment of the present disclosure.

FIG. 4 illustrates a generalized embodiment of an information handling system 400. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below, and operates to perform one or more of the methods described below. Information handling system 400 includes processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420 and 425, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432, and provides a video display output 435 to a video display 434. In a particular embodiment, information handling system 400 includes separate memories that are dedicated to each of processors 402 and 404 via separate memory interfaces. An example of memories 420 and 425 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412, or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on a separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400. Management device 490 can operate off of a separate power plane from the components of the host environment so that the management device receives power to manage information handling system 400 when the information handling system is otherwise shut down. An example of management device 490 includes a commercially available BMC product or other device that operates in accordance with an Intelligent Platform Management Initiative (IPMI) specification, a Web Services Management (WS-Man) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A liquid air assisted cooling (LAAC) system for cooling a component of an information handling system, the LAAC system comprising:
   an LAAC module; and
   a baseboard management controller configured to determine a quantity of coolant loss in the LAAC module, wherein the baseboard management controller determines the coolant loss based upon an indicated speed of a pump of the LAAC module.

2. The LAAC system of claim 1, wherein the indicated speed of the pump includes an indication of the revolutions per minute (RPM) of the pump.

3. The LAAC system of claim 1, wherein the baseboard management controller is further configured to provide a speed setting signal to the pump.

4. The LAAC system of claim 3, wherein the baseboard management controller further determines the coolant loss based upon the speed setting signal.

5. The LAAC system of claim 4, wherein the speed setting signal includes a pulse width modulation (PWM) signal.

6. The LAAC system of claim 4, wherein in determining the quantity of coolant loss, the baseboard management controller is further configured, in an initialization phase when the LAAC module is known to have a maximum coolant level, to correlate a maximum speed setting and a first indicated speed with the maximum coolant level.

7. The LAAC system of claim 6, wherein in determining the quantity of coolant loss, the baseboard management controller is further configured, in an evaluation phase subsequent to the initialization phase, to corelate the maximum speed setting and a second indicated speed that is greater than the first indicated speed with a particular amount of coolant loss in the LAAC module.

8. The LAAC system of claim 7, wherein the baseboard management controller is further configured to determine that the particular amount of coolant loss is greater than a threshold.

9. The LAAC system of claim 8, wherein in response to determining that the particular amount of coolant loss is greater than the threshold, the baseboard management controller is further configured to provide an indication that the particular amount of coolant loss is greater than the threshold.

10. A method for cooling a component of an information handling system with a liquid air assisted cooling (LAAC) system, the method comprising:

providing, in the information handling system, an LAAC module; and determining, by a baseboard management controller of the information handling system, a quantity of coolant loss in the LAAC module, wherein the baseboard management controller determines the coolant loss based upon an indicated speed of a pump of the LAAC module.

11. The method of claim 10, wherein the indicated speed of the pump includes an indication of the revolutions per minute of the pump.

12. The method of claim 10, further comprising providing, by the baseboard management controller, a speed setting signal to the pump.

13. The method of claim 12, further comprising determining, by the baseboard management controller, the coolant loss based upon the speed setting signal.

14. The method of claim 13, wherein the speed setting signal includes a pulse width modulation signal.

15. The method of claim 13, wherein in determining the quantity of coolant loss, the method further comprises:

correlating, by the baseboard management controller, in an initialization phase when the LAAC module is known to have a maximum coolant level, a maximum speed setting and a first indicated speed with the maximum coolant level.

16. The method of claim 15, wherein in determining the quantity of coolant loss, the method further comprises:

correlating, by the baseboard management controller in an evaluation phase subsequent to the initialization phase, the maximum speed setting and a second indicated speed that is greater than the first indicated speed with a particular amount of coolant loss in the LAAC module.

17. The method of claim 16, further comprising:

determining that the particular amount of coolant loss is greater than a threshold; and in response to determining that the particular amount of coolant loss is greater than the threshold, providing an indication that the particular amount of coolant loss is greater than the threshold.

18. An information handling system, comprising:

a processor;

a liquid air assisted cooling (LAAC) module for cooling the processor; and a baseboard management controller configured to determine a quantity of coolant loss in the LAAC module, wherein the baseboard management controller determines the coolant loss based upon an indicated speed of a pump of the LAAC module.

\* \* \* \* \*